Patented Dec. 17, 1929

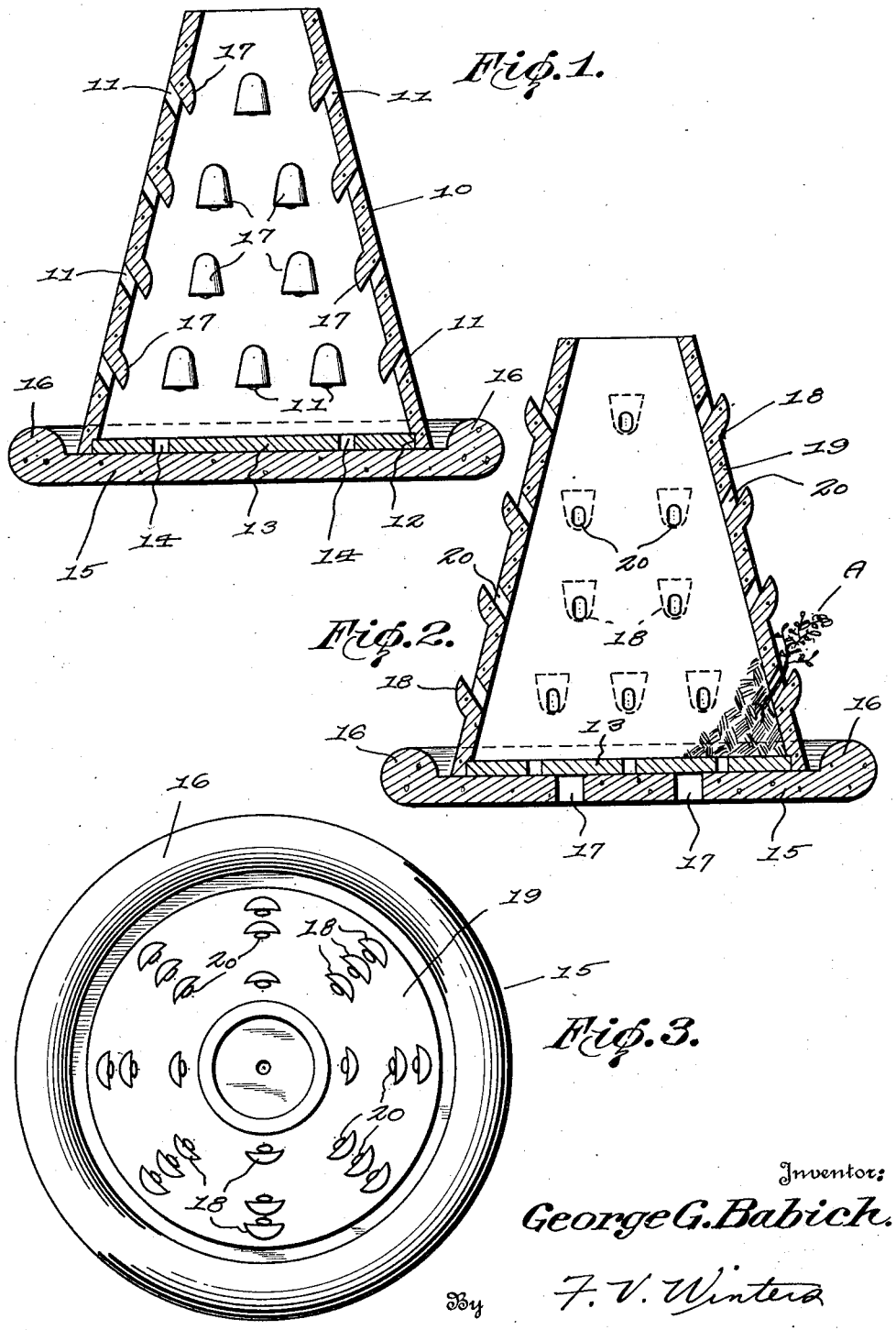

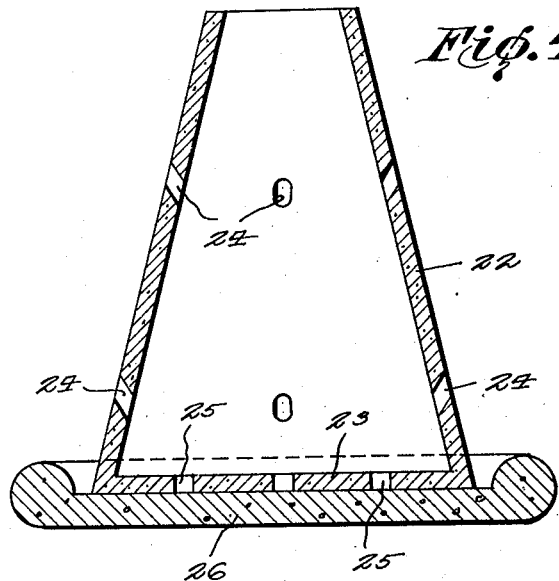
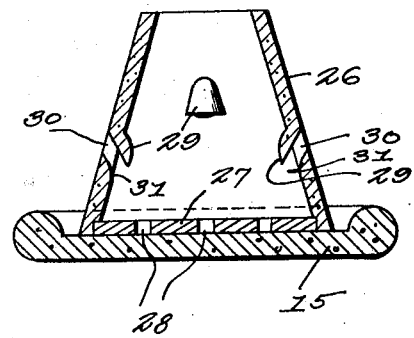
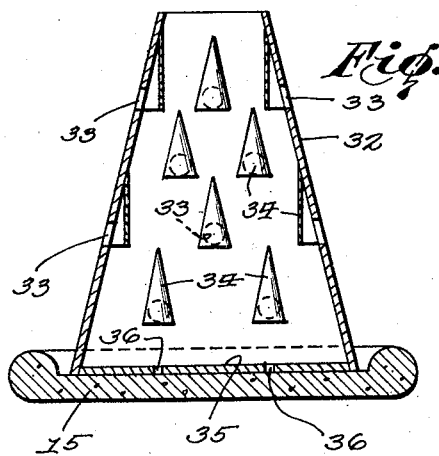
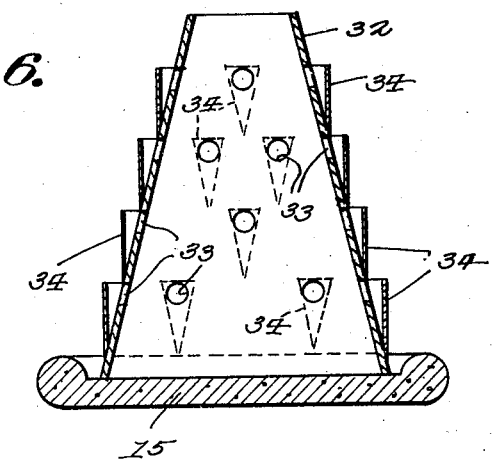
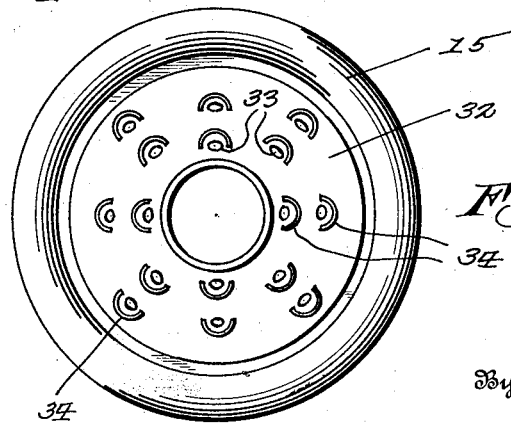

1,740,057

UNITED STATES PATENT OFFICE

GEORGE G. BABICH, OF NEW YORK, N. Y.

PLANT PROPAGATOR

Application filed July 12, 1927. Serial No. 205,077.

This invention relates to a propagator, which may be moulded either by hand, or formed in a mould, and of any suitable plastic material, such as cement, for instance, and same may be reinforced in some instances or produced without reinforcement, as may be optional, it also being obvious that the said propagator may be made in any height or diameter desired.

This invention relates generally to plant husbandry, but has particular reference to a device adapted to grow plants, flowers, or the like, and which has been termed a "plant propagator".

The primary object of the invention is to provide a receptacle of suitable configuration and dimension and from which may issue, plants, shrubs or flowers, in a manner to completely cover said receptacle and produce a solid mass of vegetation exceedingly decorative and pleasing to the eye.

Another object is to provide means whereby the growing plants may find exit to the air and sunlight and thus continue their growth and flowering at a point exteriorly of said receptacle.

Another object is the provision of a support for said receptacle whereby a certain quantity of water may be received and retained for the growing plants.

As will presently appear the receptacle itself assumes the configuration of a truncated cone in cross-section and this arrangement permits the exit of the plants in a series disposed inwardly of the lower series from the bottom to the top of said receptacle.

The invention is further featured by the provision of means in the form of lips positioned exteriorly and interiorly of the receptacle. In the former case the said lips tend to catch rain water to convey the same within the vessel, while the latter disposition prevents the washing away of earth about the exit means when said receptacle is watered from the top.

Additional features and advantages are derived by the provision of closure means, both exteriorly and interiorly of some of the receptacles, whereby moisture may be retained and the plants protected during the watering operation.

With these objects in view, together with others which will appear as the description proceeds, the invention resides in the novel formation, combination and arrangement of parts, all as will be described more fully hereinafter, illustrated in the drawings, and particularly pointed out in the claims.

In said drawings:

Figure 1 is a vertical central sectional view of my improved plant propagator, showing the lips arranged interiorly thereof.

Fig. 2 is a similar sectional view, but illustrating the lips positioned exteriorly of the receptacle, and further illustrating the expected growth of a plant.

Fig. 3 is a plan view of Fig. 2. This view is also typical of Fig. 1 with the lips removed.

Fig. 4 is a sectional view of another form devoid of the lip arrangement.

Fig. 5 is a vertical section of another form of the article having a perforated bottom plate and lip arrangement.

Fig. 6 is a sectional view of a form provided with interior closure members and a bottom plate.

Fig. 7 is a similar view but illustrating the closure members exteriorly of the receptacle and arranged without a bottom plate, and Fig. 8 is a plan view of Fig. 7.

Referring now in detail to the accompanying drawings let 10 denote the receptacle shown in Fig. 1, which is provided with upwardly inclined sides having a series of angularly disposed openings 11 therein. Said receptacle is preferably moulded and reinforced to provide a structure having both ends open, the bottom thereof being internally recessed, as indicated at 12, to receive a base member 13 having a plurality of apertures therein. These apertures 14 abut the supporting member 15 which latter is provided with an upwardly directed marginal flange 16 and thus a recess is defined wherein a certain amount of water may repose and subsequently be drawn up into the earth-filled receptacle for absorption by the plants to be grown therein. Moulded integrally with said receptacle are a plurality of lips 17 which deflect angularly within and toward the center of said receptacle. As will presently appear, the purpose of this arrangement is to prevent the earth from washing out or falling out more particularly when said receptacle is being provided with moisture in the form of water.

The article shown in Fig. 2 is somewhat similar to the above described form with the exception that the base member 15 may be apertured as indicated at 17, and the lips 18 in this instance project exteriorly of the receptacle 19. In this case the lips direct the growth of the plant A as it emerges from the earth and through the apertures or openings 20 thereof. The base member 15 is also provided with a marginal flange 16 and a bottom 13 suitably apertured as in Fig. 1.

In Fig. 3 the form shown in Fig. 2 is illustrated in plan and it will be observed that the lips 18 are arcuately disposed and arranged in a staggered relation throughout the surface of the receptacle. In both forms shown in Figs. 1 and 2 I prefer to reinforce the base members 15 in order to provide a rigid support and the reinforcing of the receptacles themselves will depend on their size, as obviously receptacles of relatively large dimensions will require reinforcing while the smaller ones may be relieved of the same.

Figure 4 illustrates a receptacle 22 presenting a bottom 23, moulded therewith. Depending on the size of the same I may reinforce the body portion, but in all events angular openings 24 are provided with the sides for the exit of the growing plants and the bottom 23 will be provided with a series of apertures 25. The base 26 is similar to the form shown in Fig. 1, and may or may not be reinforced as desired.

The form shown in Fig. 5 is the moulded type, the receptacle 26 having both ends open and the bottom recessed to receive the closure 27 as in the case of the form shown in Figs. 1 and 2. Said closure 27 is similarly apertured as indicated at 28 and is adapted to abut the base member 15 constructed in accordance with the forms shown in Figs. 1 and 2. The lips 29 are arranged interiorly of the receptacle 26 above the openings 30, the bottoms of the latter being preferably rounded, as indicated at 31, to assist the emergence of the plant. In all the forms showing the separable closure or bottom portion, I prefer to cement the same to the receptacle in any approved manner.

Figures 6 to 8 inclusive, like unto Figs. 1 and 2, show respectively an internal and an external lip arrangement. In Figure 6 the receptacle 32 is formed of thin material, such as metal, and the openings therein, designated at 33, are provided with cover pieces 34. The bottom 35 is apertured as indicated at 36 and the whole received in a base member 15. In Fig. 7 and also Fig. 8, said cover pieces 34 are disposed exteriorly of the receptacle 32. No bottom member is required but the usual base member 15 is used.

In using the several forms of the article, a suitable quantity of earth is placed in each of the receptacles and seeds or small plants inserted through the several openings. In this condition the growing plants emerge through the several openings and continue their growth exteriorly of the receptacle until the same is completely covered by a mass of plants or flowers, variegated in colors and producing an article exceeding ornamental and pleasing to the artistic sense.

During the growth of the plants, and thereafter, water may be introduced in the open top end of the receptacles; said water after passing through the earth therein rests in the recess formed in the base member 15 where it may be absorbed by the plants. The inwardly directed lips protect the plants adjacent the openings in that they form a water shed and further the exteriorly arranged lips tend to direct the growth of the plant and of course catch a certain quantity of rain water.

It is manifest that a variety of plants may be used and also it is within the province of the invention to transplant larger bushes or the like in the top opening of the several receptacles. The openings in the sides of the receptacles may be of various sizes and obviously the size of the receptacles themselves will depend upon the use and desire of the owner.

While the above illustrates the preferred embodiments of the invention, it is to be understood that changes and alterations within the spirit of the invention and the scope of the claims, may be resorted to liberally.

I claim:

1. An article of the class described comprising a receptacle having inwardly inclined sides presenting a series of angularly disposed openings therein and a series of independent lips adjacent said openings and alined therewith, and a recessed base member for supporting said receptacle.

2. An article of the class described comprising a receptacle having upwardly inclined sides presenting a series of angularly disposed openings therein, a series of independent lips adjacent said openings and alined therewith, a perforated bottom for said receptacle, and a recessed base member for supporting said receptacle.

3. An article of the class described comprising a receptacle having upwardly inclined sides presenting a series of angularly disposed openings therein, a series of lips extending exteriorly of said receptacle and being alined with said openings, a perforated bottom for said receptacle and a recessed base member for supporting said receptacle.

4. An article of the class described comprising a receptacle having upwardly inclined sides presenting a series of angularly disposed openings therein, a series of integral lips adjacent said openings and alined therewith, a perforated bottom for said receptacle and a recessed base member for supporting said receptacle.

5. An article of the class described comprising a receptacle having a series of openings arranged therein, cover members disposed exteriorly of said receptacle and having their top edges aligned with the tops of said openings, and a recessed base member for supporting said receptacle.

6. An article of the class described comprising a receptacle having upwardly inclined sides presenting a series of angularly disposed openings therein, a series of independently formed lips extending exteriorly of said receptacle and being aligned with said openings and adapted to catch and convey moisture to the interior of said receptacle, a perforated bottom for said receptacle and a recessed base member for supporting said receptacle and for retaining moisture therein.

In testimony whereof I affix my signature.

GEORGE G. BABICH.